(12) United States Patent
Khosid et al.

(10) Patent No.: US 8,783,009 B2
(45) Date of Patent: Jul. 22, 2014

(54) METHOD AND SYSTEM FOR ENHANCING START OF A TURBINE ENGINE, AND IGNITION MODULE

(75) Inventors: Savely Khosid, Haifa (IL); Arie Peretz, Haifa (IL); Amichay H. Gross, Haifa (IL); Amiran Leitner, Haifa (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 916 days.

(21) Appl. No.: 12/879,227

(22) Filed: Sep. 10, 2010

(65) Prior Publication Data

US 2010/0326086 A1 Dec. 30, 2010

Related U.S. Application Data

(63) Continuation of application No. PCT/IL2009/000264, filed on Mar. 9, 2009.

(30) Foreign Application Priority Data

Mar. 11, 2008 (IL) .......................................... 190103

(51) Int. Cl.
*F02C 7/264* (2006.01)

(52) U.S. Cl.
USPC .................................................... 60/39.821

(58) Field of Classification Search
CPC ....... F02C 7/264; F02C 7/272; F05D 2230/80
USPC ......... 60/39.821–39.828, 219, 234, 251–253, 60/778, 781, 789
See application file for complete search history.

(56) References Cited

U.S. PATENT DOCUMENTS

| | | | |
|---|---|---|---|
| 2,842,937 | A | 7/1958 | Clark |
| 2,890,569 | A | 6/1959 | Kittredge |
| 2,985,104 | A | 5/1961 | Fox |

(Continued)

FOREIGN PATENT DOCUMENTS

| | | |
|---|---|---|
| DE | 1 901 682 A1 | 7/1969 |
| WO | 2008/065656 A2 | 6/2008 |

OTHER PUBLICATIONS

Israeli Office Action dated Jan. 31, 2012 (and English translation thereof) in counterpart Israeli Application No. 190103.

(Continued)

*Primary Examiner* — Phutthiwat Wongwian
(74) *Attorney, Agent, or Firm* — Holtz Holtz Goodman & Chick PC (57) ABSTRACT

A method, a system, and a product for enhancing the start of a turbine engine by providing a replaceable ignition module including a solid combustible substance, that when ignited, or a solid oxidizer substance, that when heated, releases hot gases rich in oxidizing species. The module includes a solid substance(s) appropriately selected as: a solid-propellant grain (SPG) and a solid oxidizer (SO); or an oxygen-rich burning substance (OBSS); or a solid-propellant grain and an oxygen-rich burning substance; or an oxygen-rich burning solid substance and a solid oxidizer. The replaceable module further contains an initiator for the initiation of the solid combustible substance, or solid-propellant grain by an initiation command (IC). The hot gases released by the ignition module start and enhance the combustion process of the air-and-fuel mixture by successive fuel heating and vaporization, followed by ignition.

20 Claims, 6 Drawing Sheets

(56) References Cited

U.S. PATENT DOCUMENTS

| | | |
|---|---|---|
| 4,161,102 A | 7/1979 | Jasas et al. |
| 4,712,371 A | 12/1987 | Weber |
| 4,860,533 A * | 8/1989 | Joshi ............................ 60/776 |
| 5,198,147 A | 3/1993 | Zhang et al. |
| 5,231,822 A | 8/1993 | Shekleton |
| 5,804,146 A | 9/1998 | Heyer et al. |
| 6,182,436 B1 * | 2/2001 | Prociw et al. .................. 60/776 |
| 6,370,861 B1 | 4/2002 | Box |
| 6,374,592 B1 | 4/2002 | Box et al. |
| 6,941,760 B1 | 9/2005 | Jones |
| 2010/0043444 A1 | 2/2010 | Gross et al. |

OTHER PUBLICATIONS

International Search Report and Written Opinion dated Sep. 21, 2010 (in English) issued in parent International Application No. PCT/IL2009/000264.

\* cited by examiner

FIG.1

PRIOR ART

METHOD AND SYSTEM FOR ENHANCING START OF A TURBINE ENGINE, AND IGNITION MODULE

The present application is a Continuation of PCT/IL2009/000264 filed on 9 Mar. 2009.

TECHNICAL FIELD

The present invention relates in general to the operation of turbine engines, and more particularly, to a method, a system, and an ignition module for enhancing the starting capability of turbine engines under various ambient conditions.

BACKGROUND ART

Starting the operation of a turbine engine is an essential, but also a difficult phase of operation, in particular in the case of relatively small engines. Most often, small turbine engines, e.g. auxiliary power units, are optimized to operate within a limited operational regime requiring airflow pressure and temperature that may be quite different from the actual conditions existing when the engine is started.

In broad terms, a turbine engine operates by ingestion of a mass of external air through an intake section disposed upstream in the fore portion of the engine. The ingested air is compressed by a rotating compressor, which is positioned in a compressor section accommodated downstream of the air intake. The compression process increases the pressure and the temperature of the ingested air.

The compressed air then flows downstream into a combustion section including one or more combustion chambers, in which fuel is injected and atomized or vaporized, and mixed with a portion of the ingested air to form a fuel-air mixture. Another portion of the air is gradually introduced into the combustion chamber(s) to dilute and cool the gases produced by the combustion process. Next, the fuel-air mixture is ignited, whereby the temperature increases. The diluted combustion gases then flow downstream into a turbine section having a turbine, which is thereby rotated. Typically, the turbine is rotationally coupled to the compressor by a common shaft supported by appropriate bearings. Finally, the exhaust gases flow downstream through and out of the turbine into an exhaust section. The resulting energy, in the form of the shaft rotation or the exhaust gas velocity, is used for driving a power-consuming unit, or for producing thrust.

A turbine engine is supposed to include the various portions mentioned hereinabove, and also includes further ancillary equipment, not mentioned hereinabove, necessary for proper operation of the engine.

Before functioning properly to provide the expected power or thrust, the turbine engine has first to be started and thereafter accelerated to a stable operational regime. Frequently, the starting process of a turbine engine is initiated when the pressure and temperature of the ambient air, and of the air in the combustion chamber(s), are much lower than the specific values for which the engine was designed. Under such adverse conditions, the combustion process may fail to produce the energy necessary for accelerating the turbine engine to a steady operational regime. Furthermore, harsh environmental conditions cause the starting process of a turbine engine to become difficult to achieve, if at all, unless additional provisions are provided.

Various proposals to improve the starting of a turbine engine under unfavorable circumstances have been cited. U.S. Pat. No. 5,231,822 by Shekleton, referred to hereinbelow as Shekleton, recites enhanced starting capability of a turbine engine by controllably bleeding compressed air from the airflow path at a variable rate by means of valves and ducts. Thereby, Shekleton adds components and weight in the form of peripheral equipment in order to improve the starting process.

U.S. Pat. No. 6,374,592 by Box et al., referred to herein below as Box et al., recites the addition of energy to a turbine engine in the form of supplemental heat provided by burning of solid fuel. Box et al. disclose a quantity of solid fuel or propellant that is attached to the inside of the combustion chamber of a turbine engine. When the engine begins a starting sequence, a starter sets the spinning of the compressor in motion, and thereby a flow of air is pumped through the engine. The solid fuel or propellant is then heated by an electric heater element until it begins to burn. The combustion of the solid fuel increases the temperature of the combustion chamber, so that when an atomized or vaporized liquid fuel is injected, the temperature within the combustion chamber is sufficient to allow the liquid fuel to burn in a self-sustaining manner. Box et al. thus dispose both an electrical heater and a quantity of solid fuel in the interior of the combustion chamber.

It is well known that the addition of oxygen to the combustion process drastically improves the starting process of turbine engines, as recited by Chen et al., in "Effect of Oxygen Addition on Ignition of Aero-Gas Turbine at Simulated Altitude Facility", J. Energy, Vol. 6, No. 6, November-December 1982, pp. 425-429.

U.S. Pat. No. 6,941,760 by Jones, referred to hereinbelow as Jones, discloses a starting system for expendable turbine engines having a tank of gaseous oxygen pressurized to some 5000-7000 psig. Oxygen is communicated from the tank to a compressor through one passage to spin-up a rotor, and through another passage to provide light-off oxygen for the atomized fuel within the combustion chamber. Jones thus requires a bottle of oxygen at high pressure and associated accessories, which are rather voluminous and heavy and become a deadweight ballast after the completion of the starting process. The density of the molecular oxygen in the tank is 0.4-0.6 gram per 1 $cm^3$, even without taking into account the volume of tank walls.

U.S. Pat. No. 4,161,102 by Jasas et al., referred to herein below as Jasas et al., recites a turbine engine having a starting system that comprises a separate auxiliary combustion chamber having a source of fluid combustible fuel and a source of fluid oxidizer, and appropriate fluid conduits to the main chamber. A portion of the hot exhaust gas exiting the auxiliary combustion chamber is preferably diverted and injected with supplemental oxygen into the main combustion chamber of the turbine engine, thereby initiating self-sustained combustion. Another portion is used to drive the main turbine and hence the rotor. Jasas et al. thus require a separate auxiliary combustion chamber in addition to the conventional combustion chamber(s), a source of fluid combustible fuel, a source of fluid oxidizer, and appropriate fluid conduits with all necessary hardware.

It would thus be advantageous to devise a method and means for enhancing the starting process of a turbine engine by raising the temperature inside the combustion chamber(s) and simultaneously providing additional oxygen to the combustion process. This, however, by provision of means disposed solely on the exterior of the turbine engine to permit fast and easy replacement of spent means without requiring the dismantling of the engine, and to allow retrofit of existing engines. The devised means should preferably be configured as a single solid-state unitary module void of moveable elements, generate oxygen in situ, supply heat, and not be pressurized for the sake of safe storage. Such means would allow, for example, running an Acceptance Testing Procedure (ATP) on a turbine engine, and thereafter replace the spent starting means for immediate return of the tested engine to full operational service.

DISCLOSURE OF THE INVENTION

In general, the starting process of a turbine engine is a difficult procedure, and this is especially true for small-size turbine engines, and even more so when starting is attempted under adverse conditions, including low ambient air pressure and temperature, which affect the reliability of the process.

These starting difficulties are related to the fact that for most small turbine engines, stable self-sustained operation is obtained only above a certain rotational speed (so-called "idle speed"), which depends on the ambient conditions. One problem with starting a turbine engine is that as long as the actual number of RPM (Revolutions Per Minute) is lower than the idle RPM, the amount of air driven into the engine by the compressor is small and may be insufficient for maintaining a stable self-sustained combustion process. Moreover, even when the starting process enables a stable combustion process to be reached, the energy produced by the fuel combustion may be insufficient for acceleration of the engine to at least the idle speed. Both cases occur due to an insufficient amount of oxygen in the primary combustion zone. The situation is further worsened by harsh ambient conditions, such as low ambient-air density or pressure.

However, a reliable and successful first-attempt starting process is a sine qua non prerequisite in certain instances, such as emergency power generators, auxiliary power units, and expendable turbine engines.

In the present invention, the solution to the abovementioned turbine engine starting-process difficulties is provided by the addition to the combustion process of hot oxygen gas, or hot gaseous oxidizing species that are generated from a mass of solid substance, which is disposed on the exterior of the engine for easy replacement and retrofit. The added oxygen or oxidizing species prevent "oxygen starvation" of the combustion chamber and enable acceleration of the rotor to the operational-regime RPM.

One implementation model of the proposed solution is achieved by use of a thermal decomposition process, which is obtained by heating a mass of solid oxidizer to release gaseous oxygen or oxidizing species. Another implementation model calls for the release of oxidizing species from the combustion of a mass of appropriately composed oxygen-rich solid propellant. In both implementations hot oxygen-rich gas is generated to enhance the combustion process and thereby improve the reliability of the starting process of the turbine engine.

Chemical oxygen generators are known per se.

For example, U.S. Pat. No. 5,198,147 by Zhang, et al., referred to as Zhang, recites a chemical oxygen generator including an oxygen-generating candle having an oxygen source, which upon decomposition will yield oxygen, and a nontoxic additive to smooth decomposition and suppress formation of toxic chlorine gas. The oxygen generator preferably includes a canister, oxygen-generating candle, and an ignition device. Triggering of the ignition device ignites an ignition pellet, which initiates decomposition of the candle body. Once initiated, the candle will sustain decomposition to release breathable oxygen until the candle is completely reacted.

Furthermore, U.S. Pat. No. 5,804,146 by Heyer, et al., referred to as Heyer, discloses a chemical oxygen generator with a chemical mass, which is accommodated inside a container to generate oxygen by a chemical reaction, and is held in the container by a gas-permeable fibrous material.

Zhang and Heyer recite applications that are totally different from the present application, even though related to oxygen generation.

SUMMARY

It is an object of the present invention to provide a method for enhancing and for implementing a system and an operative ignition module configured for enhancing the starting capability of a turbine engine for rapidly reaching a stable operational regime. The turbine engine has an exterior and an interior and comprises a compressor for ingesting and compressing air, a turbine coupled to the compressor, and at least one combustion chamber. The at least one combustion chamber is provided with a controlled mixture of air and fuel from a fuel feed system, to allow start of a combustion process when ignited.

The method comprises the steps of:
providing at least one replaceable ignition module including at least one solid combustible substance that when ignited, causes release of hot gaseous oxidizing species, or at least one decomposing oxidizer substance that when heated, releases hot gases rich in oxidizing species,
coupling the at least one replaceable ignition module in sealed releasable retention and in fluid communication with the at least one combustion chamber of the turbine engine,
initiating ignition of the at least one solid combustible substance or of decomposition of the at least one decomposing oxidizer substance and consequent release of hot gases rich in oxidizing species,
ducting the hot gases rich in oxidizing species into the at least one combustion chamber to start the combustion process by ignition of the air and fuel mixture, and
exhausting combustion products via the turbine,
whereby the hot gases rich in oxidizing species start and enhance the combustion process for reliably and rapidly reaching a stable operational regime.

It is a further object of the present invention to provide a method and means wherein the replaceable ignition module comprises at least one solid substance appropriately selected from the group consisting of: a) a solid propellant grain and a solid oxidizer; b) an oxygen-rich burning solid substance; c) a solid propellant grain and an oxygen-rich burning solid substance; and d) an oxygen-rich burning solid substance and a solid oxidizer.

It is a further object of the present invention to provide a method and means wherein the at least one replaceable ignition module contains at least one igniter (67) for the initiation of the at least one solid combustible substance in response to an initiation command, and the combustion of the at least one solid combustible substance causes the generation of hot gases rich in oxidizing species. Furthermore, the ignition of the at least one solid combustible substance causes the generation of hot gases rich oxidizing species, which are generated in situ.

It is yet an object of the present invention to provide a method and means wherein the hot gases rich oxidizing species start the combustion process of the air and fuel mixture by successive heating and fuel vaporization followed by ignition.

It is still an object of the present invention to provide a method and means wherein the turbine engine comprises a plurality of combustion chambers, and the least one replaceable ignition module is coupled to at least one combustion chamber out of the plurality of combustion chambers.

It is yet a further object of the present invention to provide a method and means wherein the at least one replaceable ignition module is coupled via a single coupling element to the combustion chamber, and is a unitary device having an initiator selected from the group consisting of electrical igniters and pyrotechnic igniters. Furthermore, the replaceable ignition module is configured for exchangeable replacement after depletion and for retrofit into existing turbine engines.

It is still a further object of the present invention to provide a method and means wherein the at least one replaceable ignition module is disposed on the exterior of the turbine engine, is replaceable without requiring dismantling of the turbine engine, is void of a substance under pressure, and is configured as a single unitary module.

It is moreover an object of the present invention to provide a method and means wherein the replaceable ignition module further includes at least one igniter opening coupled in fluid communication via at least one starter conduit to the turbine or via at least one communication conduit to the compressor, and a portion of the hot gases rich in oxidizing species are ducted via the at least one igniter opening and the at least one turbine starter conduit, or the at least one compressor starting conduit for impinging on and initiating rotation of, respectively, the turbine or the compressor.

It is yet one more object of the present invention to provide at least one replaceable ignition module configured for enhancing a start procedure of a turbine engine having an interior and an exterior, a compressor for ingesting and for compressing air, a turbine coupled to the compressor, at least one combustion chamber receiving compressed air from the compressor and providing a controlled inflammable mixture of air and fuel dosed to allow start of a combustion process when ignited. Furthermore, the at least one replaceable ignition module comprises:

a module housing encasing at least one solid combustible substance that causes generation of hot gases rich in oxidizing species when ignited, or at least one decomposing oxidizer substance that when heated, releases hot gases rich in oxidizing species, the module housing being coupled in sealed releasable retention and in fluid communication with the at least one combustion chamber, at least one initiator for initiating ignition of the at least one solid combustible substance, or of decomposition of the at least one decomposing oxidizer substance, and subsequent generation of hot gases rich in oxidizing species, and a chamber passage for ducting the hot eases rich in oxidizing species into the at least one combustion chamber for starting the combustion process by ignition of the inflammable air-fuel mixture, whereafter resulting combustion products are exhausted via the turbine, whereby the hot gases rich in oxidizing species released by the at least one replaceable ignition module start and enhance the combustion process for rapidly reaching a stable operational regime of the turbine engine.

BRIEF DESCRIPTION OF THE DRAWINGS

In the drawings, like reference characters generally refer to the same parts throughout the different views. Also, the drawings are schematic and not to scale, emphasis instead generally being placed upon illustrating the principles of the invention. Various non-limiting embodiments of the present invention are described with reference to the following description of exemplary embodiments, in conjunction with the figures in which.

MODES FOR CARRYING OUT THE INVENTION

A generic turbine engine is described hereinbelow as an example to ease the description, even though the proposed method, system and product are applicable to a wide range of turbine engines for propelling various vehicles, such as airborne, marine, or ground-driven vehicles, or as a source of power for driving machines, such as electric generators and other equipment.

Figure 1:
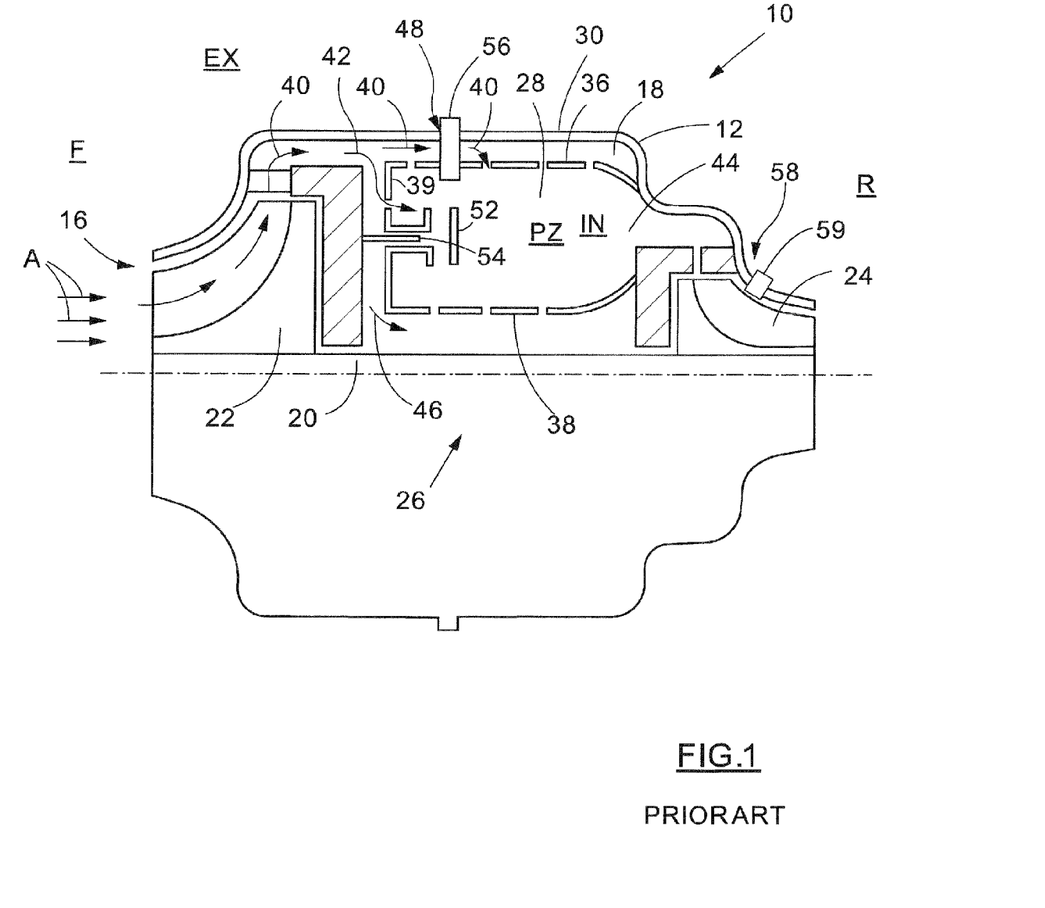
FIG. 1 shows a schematic partial cross-section of a prior-art turbine engine 10, FIG. 2 schematically illustrates an exemplary embodiment 1000 of a turbine engine operative with the present invention.

FIG. 1 shows a schematic partial cross-section of a prior-art turbine engine 10, operative with the present claimed invention, for the purpose of orientation and definition of nomenclature according to the description hereinbelow.

Conventionally, a turbine engine 10 is contained within a generally cylindrical engine housing 12, which has an exterior EX and an interior IN, and ingests air A via an air intake 16 disposed upstream, at the front end or front F of the engine 10. In the interior 18 of the housing 12, an axially rotating shaft 20, couples a compressor 22 to a turbine 24, or turbine wheel 24, which is disposed downstream of the compressor 22, toward the rear end R of the engine 10. The shaft 20 is supported by appropriate bearings, as well known in the art, but not indicated as such in FIG. 1 for the sake of simplicity. Generally, the compressor 22, the shaft 20, and the turbine 24 are referred altogether as the rotating assembly 26, or rotor 26.

In FIG. 1 the interior 18 of the housing 12 is delimited by a generally cylindrical encasing housing wall 30 and by the shall 20. The entire section of the interior 18 extending axially between the compressor 22 and the turbine 24 is referred to as the combustion chamber 28 of the engine 10. The combustion chamber 28 generally includes a flame tube 44, at least one fuel inlet 54, and is fitted with at least one igniter 56 for the ignition of an inflammable mixture of fuel and air. The igniter 56 penetrates from the exterior EX into the interior IN of the combustion chamber 28 via an igniter opening 48 traversing the housing wall 30.

Furthermore, the flame tube 44 is defined as the space of volume disposed between two generally concentrically positioned perforated cylinders, which are referred to as the outer liner 36 and the inner liner 38 that are both coupled at an upstream front-end by a perforated dome 39 disposed adjacent to and downstream of the compressor 22. The diameter of the outer liner 36 is smaller than that of the housing wall 30, and the diameter of the inner liner 38 is larger than that of the shaft 20 yet smaller than that of the outer liner 36. Both liners stretch from downstream of the compressor 22 to upstream of the turbine 24.

The two liners, 36 and 38, are connected to the perforated dome 39 at their upstream end, and the flame tube 44 itself is retained in place by structural elements known in the art but not indicated in FIG. 1 for the sake of simplicity.

A starter 59 is usually operated to initiate the rotation of the rotor 26. The starter may be selected as desired out of the many varieties of starting devices known in the art, e.g. electromechanical or pyrotechnic starters. In FIG. 1, there is shown an example of a starter, configured as a pyrotechnic starter 59, which penetrates through the housing wall 30 via a starter inlet 58. The pyrotechnic starter 59 is designed to deliver a jet of gas onto the blades of the turbine 24 so as to initiate the rotation of the rotor 26. Another option, not shown in FIG. 1 for the sake of simplicity, to initiate the rotation of the rotor 26 is by directing the jet of gas from the pyrotechnic starter 59 onto the blades of the compressor 22.

To start the operation of the engine 10, the starter 59 is used to drive the rotor 26 up to a certain rotational speed. Thereby, the now rotating compressor 22 takes in and compresses a mass of air A through the air intake 16. The ingested mass of air A is ducted to flow downstream and divides into two separate main streams of air. The first stream of air indicated by the arrows 40 flows into the peripheral space disposed between the housing wall 30 and the outer liner 36, and enters into the internal space of the flame tube 44 through a set of openings, or perforations provided in the outer liner 36.

The second stream of air 42 flows onto the front of the dome 39 and also divides into two separate flows of air. One flow of air enters the flame tube 44 through openings in the dome 39, and via the fuel vaporizers 52. The second flow 46 continues towards the space disposed between the inner liner 38 of the flame tube 36 and the shaft 20, entering the flame tube 44 via a set of openings, or perforations, in the inner liner 38.

Fuel is supplied via a controlled fuel supply system, known in the art but not indicated in FIG. 1 and the other Figures for the sake of simplicity. Fuel is injected into the forward portion of the internal space of the flame tube 44, referred to as to the primary zone PZ, via a plurality of, or via at least one fuel inlet 54, or fuel injector 54. Generally, the fuel inlet 54 is disposed on the dome 39 in the primary zone PZ, and is usually implemented as a high-pressure atomizer or as an air-assisted vaporizer, to facilitate, respectively, atomization and vaporization of the fuel. Another widely used implementation of the atomization device includes the supply of fuel through the shaft 20 and the atomization thereof by taking advantage of the centrifugal effect. Neither this last implementation, nor a control system for controlling and managing of the operation of the engine 10 appear in FIG. 1, and the other Figures, for the sake of simplicity.

The controlled mixture of air and fuel introduced into the primary zone PZ is generally ignited by at least one igniter 56, most often selected as a spark-plug, a glow-plug, a pyrotechnic igniter, a pilot flame, or as another type of igniter, all well known in the art.

To start the run of the engine 10, the starter 59, is operated. This provides initial rotation of the rotating assembly 26 and thus also of the compressor 22, which draws and compresses the air A ingested through the upstream air intake 16 into the combustion chamber 28. Next, fuel is introduced into the flame tube 44 via one or more fuel inlet(s) 54. The igniter 56 is then turned on and ignites the mixture of fuel vapor and air delivered by the fuel inlets 54, to start combustion in the primary zone PZ of the flame tube 44. Thereby, the combustion process is initiated. The combustion gases/products exiting from the combustion chamber 28 flow downstream through the turbine 24, and then out to the exterior EX via the exhaust section, not shown in FIG. 1 for the sake of simplicity.

Figure 2:
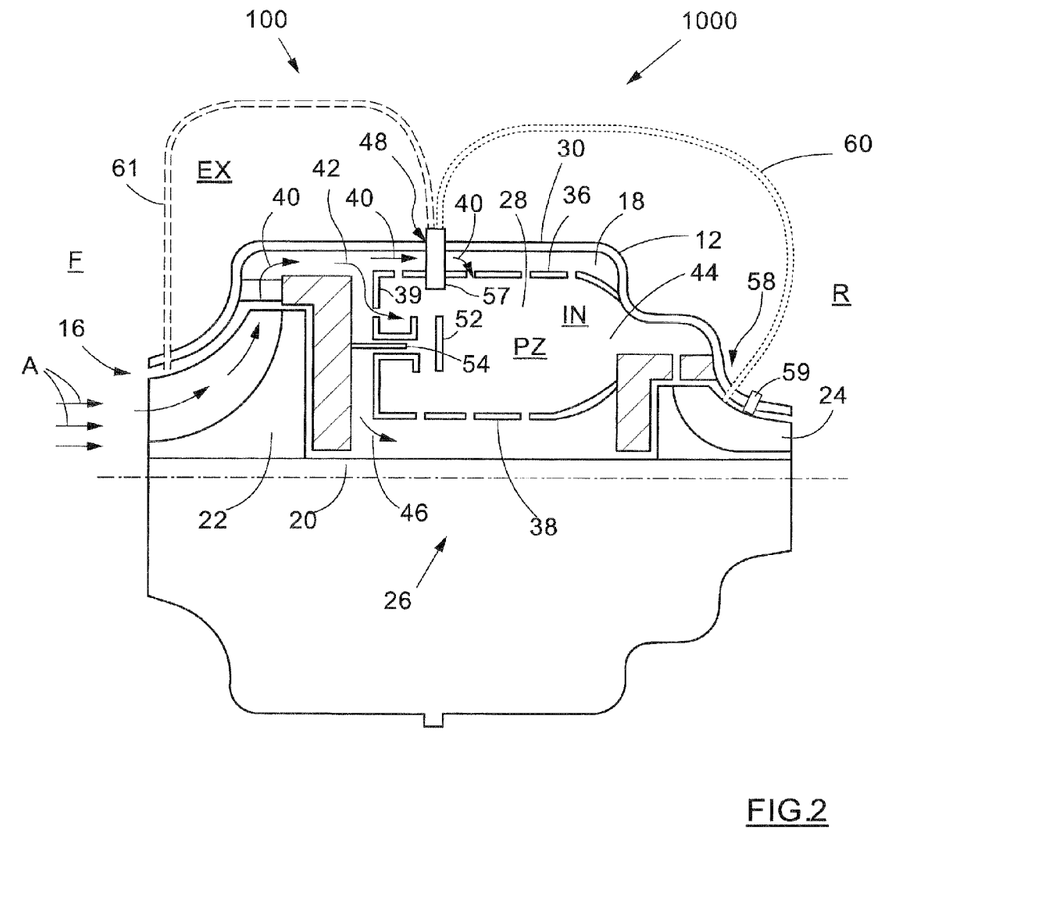

FIG. 2 schematically illustrates a turbine engine 100 as an exemplary embodiment 1000 of the method, system, and product operative with the present invention.

In FIG. 2, showing the embodiment 1000, the igniter 56 of FIG. 1 is substituted by a replaceable ignition module 57, which is configured to start the combustion process, and to enhance the starting capability of the engine 100.

When initiated, combustion is started in the replaceable ignition module 57 and subsequently, combustion products generated in situ are released as hot gases rich in oxidizing species that are injected into the combustion chamber 28 where they transfer heat to vaporize and ignite the inflammable mixture of air and fuel, related to hereinabove. The injected oxidizing species enhance the progress of the combustion process in the engine 100.

To start the operation of the engine 100 according to the embodiment 1000, which is similar to the starting procedure described hereinabove, the starter 59 is used to drive the rotor 26 up to a certain rotational speed. Thereby, the now rotating compressor 22 takes in and compresses a mass of air A entering the engine through the air intake 16. Next, fuel flows via at least one fuel inlet 54, or fuel injector 54, into the combustion chamber 28, where a controlled mixture of air and fuel is created and introduced into the primary zone PZ.

The replaceable ignition module 57 is then initiated, whereby hot gases rich in oxidizing species are generated in situ, and introduced into the combustion chamber 28 to start and promote the combustion process. By being hot, the gases rich in oxidizing species contribute to heat and thus to vaporize the liquid fuel introduced into the primary zone PZ. Furthermore, by being rich in oxidizing species, the hot gases also enhance the starting process of the engine 100 by boosting the combustion process.

Still with the embodiment 1000 and if so desired, the starter 59 may be retrieved from the starter inlet 58, which is then coupled in fluid communication via a turbine starting conduit 60 to the replaceable ignition module 57. Thereby, when the replaceable ignition module 57 is initiated, hot gases flow via the turbine-starting conduit 60, shown by a dotted line in. FIG. 2, and the starter inlet 58 to impinge on the turbine wheel 24. These impinging gases cause the turbine 24 to rotate, and thereby also begin the rotation of the compressor 22. Alternatively, the initial rotation of the rotor 26 may be accomplished by directing flow of gas exiting from the ignition module 57 onto the blades of the compressor 22, via a compressor starting conduit 61, shown by a dashed line in FIG. 2, coupling between the ignition module 57 and the compressor 22.

Therefore, upon initiation of the replaceable ignition module 57, the hot gases rich in oxidizing species simultaneously start the rotation of the rotating assembly 26, heat, vaporize and initiate the combustion of the controlled mixture of air and fuel, and further enhance the starting process of the engine 100 by adding oxidizing species to the combustion process. The replaceable ignition module 57 may be configured in various shapes, and sizes. Since the replaceable ignition module 57 is a device containing only solid-state components, there is no need for additional elements such as valves, fluid or any fluid-flow control mechanisms.

In the embodiment 1000, shown in FIG. 2, the replaceable ignition module 57 is implemented as a gas generator, using an oxidizing-species releasing material, or ORM, to deliver hot gases rich in oxidizing species. There are presented two models by which the replaceable ignition module 57 may generate hot oxidizing-species-rich gases in situ.

With the first model, a combustible solid propellant grain, or SPG, is ignited to provide hot gases that heat a mass of solid oxidizer, or SO, which in turn undergoes thermal decomposition to release a large amount of hot gaseous oxygen.

According to the second model, an oxygen-rich burning solid substance, or OBSS, is ignited to burn in self-sustained combustion and deliver combustion products containing hot gaseous oxidizing species. Oxidizing species or agents are those species that, similarly to oxygen, may cause oxidation or burning of combustible materials.

Oxidizing species include, for example, molecular oxygen $O_2$, atomic oxygen O, nitrous oxide $NO_2$, molecular and atomic chlorine $Cl_2$ and Cl, respectively, and molecular and atomic fluorine $Fl_2$ and Fl, respectively.

Solid oxidizers may include, among others, the following chemical compounds with positive oxygen balance: Ammonium Dinitrate or ADN or $NH_4N(NO_2)_2$, Hexanitrohexaazaisowurtzitane or CL-20 or $C_6H_6N_{12}O_{12}$, Hydrazinium Nitroformate or HNF or $N_2H_5C(NO_2)_3$, Oxides, Peroxides, Chlorates, Perchlorates, Nitrates, and Hydroxides.

For example, a mass of solid oxidizer SO may be made mainly of particles of potassium perchlorate or KP, which upon thermal decomposition release about 46% of their mass as gaseous oxygen. It means, that each 1 $cm^3$ of KP releases more than 1 g of the molecular oxygen $O_2$, whereas the density of oxygen in a pressurized bottle under the high pressure of 40 MPa and the temperature of 300K can reach only one half of this value, even without accounting for the inert weight of the bottle and accessories. Such a mass of solid oxidizer may be implemented by consolidation of particles, powder, pellets, or granules of one component or of a multi-component mixture of the chemical compounds and/or mixtures, as described hereinabove, in an appropriate particle-size distribution, and with a suitable solid binder, such as Viton or polyester, for example.

An engine 100 may accept more than one replaceable ignition module 57 configured to possibly include a unitary mass of solid oxidized SO, selected from the hereinabove mentioned group of compounds and out of different shapes and sizes.

Account is also taken of the fact that a turbine engine 100 fitted with a solid ORM is safer for storage in contrast with the prior art using high-pressure bottles of oxygen, for example.

A mass of solid-phase oxidizer SO may be produced, for example, by hot iso-static pressing (HIP), or by compaction of oxidizing compound particles or of a multi-fraction mixture of compound particles coated with a polymer or co-polymer, such as Viton A, which serves as a high-density binder. The aforementioned co-polymer also diminishes the hygroscopic property of the particles, if existing, and greatly contributes to their insensitivity, allowing the solid oxidizer SO to better withstand harsh ambient conditions.

Peretz et al., in their paper "Hydrazine-Based Inverse Hybrid Engine for Space Applications" presented at the $32^{nd}$ AIAA/ASME/SAE/ASEE Joint Propulsion Conference, 1996, and in the Israeli Patent No. 112592, which are enclosed herewith in whole by reference, provide details about the performance, characteristics, and methods for an iso-static consolidation manufacturing process that may be used for the implementation of the solid oxidizer mass SO.

Referring to the second model, an oxygen-rich burning solid substance, or OBSS, is a mixture or a compound of an oxidizer or oxidizers, a fuel or fuels, and various additives, which when burning yields gases rich in oxidizing species as combustion products.

Fuels or binders, also called elastomeric binders, or binders for short, such as used with solid-propellant grains, or SPGs, include, amongst others: Hydroxyl-Terminated PolyButadiene, or HTPB, Glycidyl Azide Polymer, or GAP, and PolyGlycidyl, or PG. Oxidizers may include commonly-used inorganic compounds, such as Ammonium Perchlorate, or AP, Potassium Perchlorate, or KP, and Ammonium Nitrate, or AN, or newer oxidizers, such as Ammonium Dinitramide, or ADN, for example. Plasticizers, which are added to the binder to facilitate the casting process and enhance the mechanical properties of the SPGs, may include organic compounds, such as Butanetriol Trinitrate, or BTTN, and Trimethylolethane, or TMETN. Additives may typically include bonding, curing and wetting agents, as well as antioxidants, catalysts, and stabilizers, as well known in the art. As a typical example, an OBSS is a mixture or a compound consisting of 5-20% GAP, 50-90% KP or a mixture of KP and AP, 10-22% BTTN, and 0.5-3.5% additives.

Independently of the model chosen for generating the gaseous oxidizing species, once initiated, the replaceable ignition module 57 delivers a sufficient amount of hot gases rich in oxidizing species to transfer heat to the fuel, vaporize it and ignite the controlled mixture of air and fuel vapors introduced into the combustion chamber 28, and thereby starts the combustion process in the engine 100. If desired, the hot gases rich in oxidizing species, which are delivered by the replaceable ignition module 57 may also be used to start the rotation of the rotating assembly 26 by directing the jet of gas onto either the turbine 24, or compressor 22.

After ignition and during the starting process, the replaceable ignition module 57 continues to deliver hot gaseous products rich in oxidizing species to enhance the combustion process, enabling the turbine 24 to accelerate the rotor 26 and reach at least the idle rotational speed, which is the minimal threshold RPM required for the stable self-sustained operational regime of the engine 100.

With the addition of fuel and air, gradually, yet rapidly, the combustion process inside the combustion chamber 28 grows and accelerates the rotor 26, well past the idle rotational RPM speed and into the operational work regime of the engine 100.

Under moderate ambient conditions, an engine 100 equipped with a gas generator that delivers hot gases rich in oxidizing species such as those released by the replaceable ignition module 57, will be supplied with an additional amount of oxygen that is provided to the combustion chamber 28, thus enabling a more rapid and more reliable engine-starting process. Thereby, the starting capability of the turbine engine 100 is enhanced, by being accommodated with the ability to reliable reach the stable idle RPM speed and beyond, faster than a similar engine missing the benefit of the replaceable ignition module 57.

When it is desired to start a turbine engine 100 under harsh adverse ambient conditions, especially under conditions of low air pressure and/or low air density, the starting process is much more difficult and is much less reliable than in more element environmental conditions. Therefore, the transfer of heat and the addition of oxygen, by means of the gas generator 57 or replaceable ignition module 57, which delivers hot gases rich in oxidizing species, improves the combustion conditions inside the combustion chamber 28 and facilitates the difficult engine starting process.

In all situations, the presence of the gas generator 57, emitting hot gases rich in oxidizing species, always enhances the starting process of the engine 100, and ensures a reliable, possibly a single-try starting process. The supply of a superfluous amount of oxidizing species supports and assists the engine 100 to accelerate first to the idle RPM speed, and then to full operational regime capability. Moreover, the presence of the replaceable ignition module 57 will always shorten the duration and increase the reliability of the starting process, and especially so under harsh ambient conditions.

In the schematic partial cross-section of FIG. 2, the fuel injector 54, the replaceable ignition module 57, and the starter 59 are all shown as single devices, but in practice these devices may be implemented in plurality and in many configuration combinations. For example, a single combustion chamber or a plurality of combustion chambers may be ignited by use of a single or more ignition modules 57 per each combustion chamber.

FIGS. 3A, 3B, 4A, and 4B illustrate various exemplary embodiments of the unitary replaceable ignition module 57.

Figure 3A:
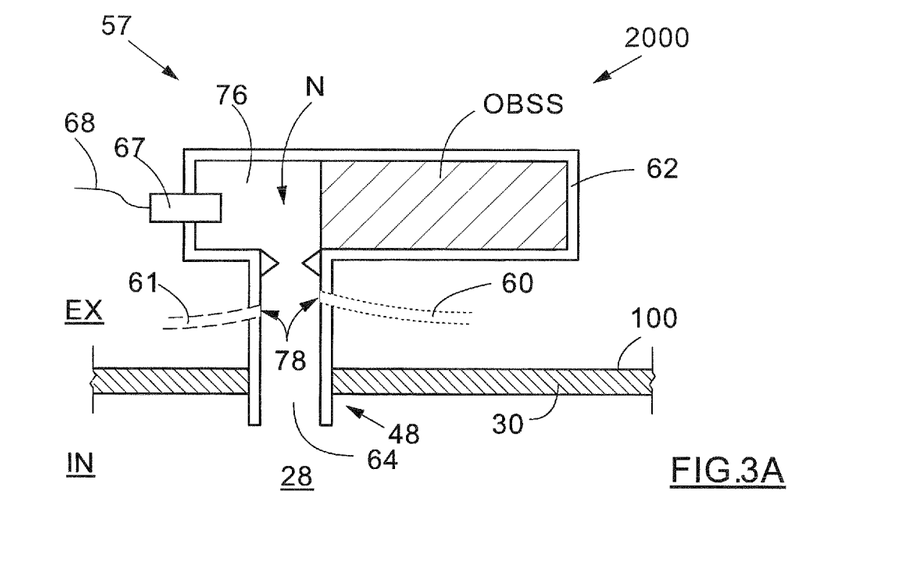
FIGS. 3A, 3B, 4A and 4B present exemplary embodiments of a replaceable ignition module.

FIG. 3A presents an exemplary embodiment 2000 of a replaceable ignition module 57, disposed on the exterior EX of the engine 100. The module 57 is encased in a module housing 62 having a chamber passage 64 coupled in sealed releasable fluid communication from the exterior EX via the engine housing wall 30 into the interior IN of the combustion chamber 28. The module housing 62 holds an oxygen-rich burning solid substance OBSS, which is obtained by the combination of a fuel, which serves also as a binder, with an oxidizer, and the conventional additives, known in the art of making solid propellant grains, such as a plasticizer, and bonding, curing and wetting agents. When ignited, the OBSS generates hot gases rich in oxidizing species, which are ducted into the interior IN of the combustion chamber 28 via the chamber passage 64.

The module housing 62 contains also at least one initiator 67, which may be activated in response to an initiation command possibly received via an electric conductor 68. Initiation is possible by various means known in the art, such as a pyrotechnic squib, with or without a booster charge. The initiator 67 is appropriately configured and properly disposed in adjacent relationship with the oxygen-rich burning solid substance OBSS for the ignition thereof.

When activated, the initiator 67 ignites the OBSS, which in turn delivers hot gases rich in oxidizing species that are ducted via the chamber passage 64 into the interior IN of the combustion chamber 28. Once having penetrated into the interior of the combustion chamber 28, the hot gases rich in oxidizing species react with the mixture of air and fuel to cause in succession, heating, fuel vaporization, and mixture ignition thereof. After ignition, the additional supply of those gases further enhances the combustion process, whereby the starting process of the engine is accelerated and is reliably achieved in a one-shot operation.

In the various embodiments 1000 and 2000 the chamber passage 64 is shown as having a nozzle N, but if desired, may be implemented as a duct. The nozzle N enables controllable conditions, such as pressure and flow rate, in the free volume 76 of the module housing 62. In addition, the chamber passage 64 is configured for releasable sealed attachment to the engine housing wall 30, so that when the replaceable ignition module 57 is depleted, replacement becomes straightforward and easy, and does not require the dismantling of the turbine engine. The chamber passage 64 is thus the only attachment coupling element retaining the replaceable ignition module 57 in sealed releasable coupling to the combustion chamber 28, or to the turbine engine 100.

Moreover, the replaceable ignition module 57 may be configured for retrofitting existing turbine engines 10, shown in FIG. 1. Retrofitting may include retrieval of the igniter 56 from the igniter opening 48 and replacement by a replaceable ignition module 57. Furthermore, retrofitting may also include the accommodation of existing turbine engines 10 for coupling thereto of the replaceable ignition module 57 in releasable sealed fluid communication with the combustion chamber 28.

It is noted that with reference to solid substances, whether combustible or decomposing, the term solid refers to non-liquid substances and may thus include semi-solids, pastes, and gels.

Figure 3B:
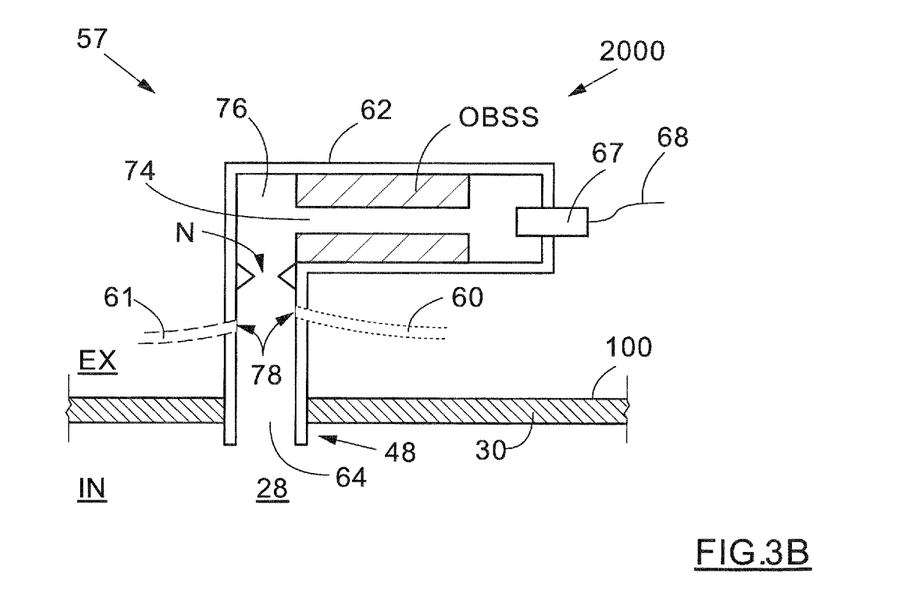

FIG. 3A shows a configuration, in which the combustion of the OBSS is realized as an "end burning" process, thus with a constant burning surface front FIG. 3B shows another possible configuration, in which the combustion of OBSS is realized as an "internal burning" process with a constant or varying burning-surface development. In this case, the initiator 67 is properly disposed on the opposite side of the housing 62, thus allowing its combustion products to pass through the perforation channel 74 and thereby ignite the initial burning surface of the OBSS.

As a variant of the embodiment 2000, shown in FIGS. 3A and 3B, the ignition module 57 may also perform as a starter, as shown schematically by the dotted and dashed lines, respectively 60 and 61 in FIGS. 2, 3A, 3B, 4A, 4B and 5 to 8. This variant includes a turbine-starting conduit or a compressor starting conduit, respectively 60 or 61, that direct the hot gases emanating from the ignition module 57 either to the turbine 24 via the turbine-starting conduit 60, or to the compressor 22 via the compressor-starting conduit 61, to drive the rotor 26.

Figure 4A:
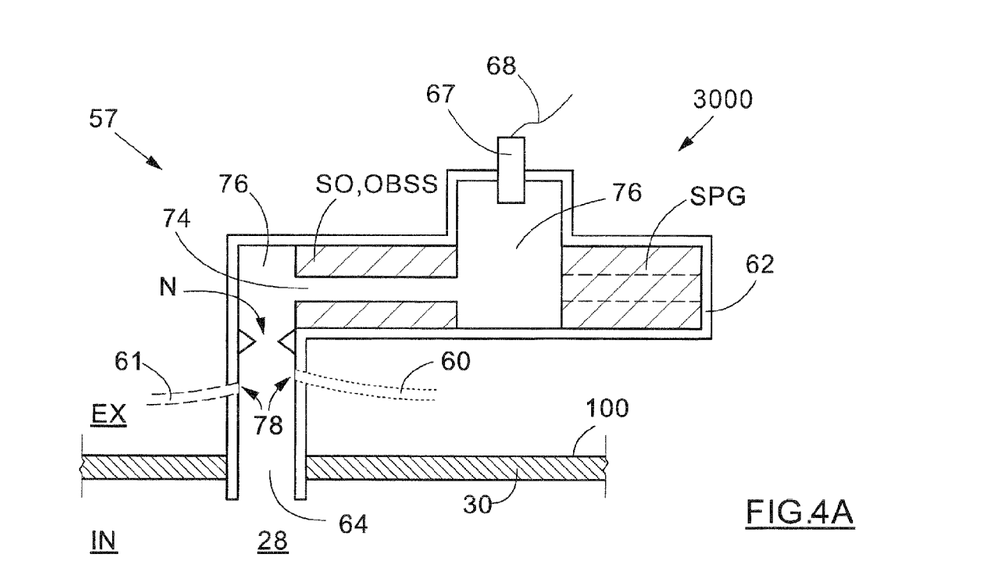

FIG. 4A depicts another exemplary embodiment 3000 of the replaceable ignition module 57, which is contained in a module housing 62 having a chamber passage 64. Since all the embodiments described hereinbelow are coupled to the turbine engine 100 via the chamber passage 64, as described with reference to the embodiment 2000, the description related to the passage 64 will not be repeated.

The embodiment 3000 of the ignition module 57, shown in FIG. 4A, contains two solid substances, namely a mass of conventional solid propellant grain SPG and a mass of solid oxidizer SO. A channel 74 is disposed within and throughout the mass of solid oxidizer SO to permit the passage therethrough of gases. Although depicted as an interior and concentric throughout passage, the channel 74 may be configured as a single or a plurality of passages or perforations through the solid oxidizer SO, or as grooves or furrows disposed on the periphery thereof, or be selected as a combination of internal and peripheral passages. The configuration of the solid oxidizer SO may be selected according to the desired development (regression) of the decomposition surface and thus of the rate of decomposition products production.

The solid oxidizer SO may be disposed in continuation, possibly in axial continuation to the conventional solid propellant grain SPG, and a free space 76 comprising an initiator 67, may separate between the two solid substances, respectively the SPG and SO.

The combustion of the mass of SPG may be realized as an "end burning" or as an "internal burning" process. In the last case, the SPG block should have an internal burning surface, produced by some perforation, such as marked, for example, by dashed lines in FIG. 4A. Actually, the configuration of the SPG may be selected according to the desired burning surface development characteristics.

For operation, when activated, the initiator 67 ignites the solid propellant grain SPG. Next, the solid propellant grain SPG begins to burn and emits hot gases that flow through and heat the exposed surface of the solid oxidizer SO. The now heated solid oxidizer SO decomposes layer by layer and releases hot gaseous oxygen-rich gas that mixes with the hot gases created by the combustion of the solid propellant grain SPG, and enters into the combustion chamber 28 via the chamber passage 64. There, the hot gases rich in oxidizing species react with the mixture of air and fuel, resulting in successive heating, vaporization, and ignition, whereby the combustion process in the engine 100 is started. After ignition, the additional supply of hot gases rich in oxidizing species further enhances the combustion process, whereby the starting process of the engine is accelerated and a self-sustained function is reliably achieved in a one-shot operation.

Optionally, the solid oxidizer SO pertaining to the embodiment 3000, shown in FIG. 4A, may be replaced by an oxygen-rich burning solid substance OBSS having the same or a similar structural configuration as that of the solid oxidizer SO. This OBSS block is heated by the hot gases produced by the SPG, ignited thereby, and generates by burning hot gaseous oxidizing species. The block of OBSS may be ignited directly by the initiator 67.

In addition, the free volume 76, or another portion of the module housing 62 may optionally be accommodated with an exhaust port 78, which is preferably disposed downstream of the nozzle N and coupled in fluid communication via the turbine starting conduit 60, shown as a dotted line, to a starter inlet 58 that is disposed to duct gases for impinging on the turbine 24 of the engine 100, thereby starting the rotation of the rotating assembly 26. Both the starter inlet 58 and the turbine 24 are not shown in FIG. 4A. If desired, more than one exhaust port 78, turbine starting conduit 60, and starter inlet 58 may be implemented to lead hot gases to the turbine 24.

Alternatively, the compressor starting conduit 61, shown as a dashed line, may be implemented instead of the turbine-starting conduit 60, to lead hot gases to the compressor 22, thereby starting the rotation of the rotating assembly 26. Starting a turbine engine 10 with a pyrotechnic starter operating on the blades of the compressor 22 is known in the art. However, in that case, in contrast with the replaceable ignition module 57, the reducing gases released by conventional pyrotechnic starters are detrimental to the starting process of a turbine engine.

Figure 4B:
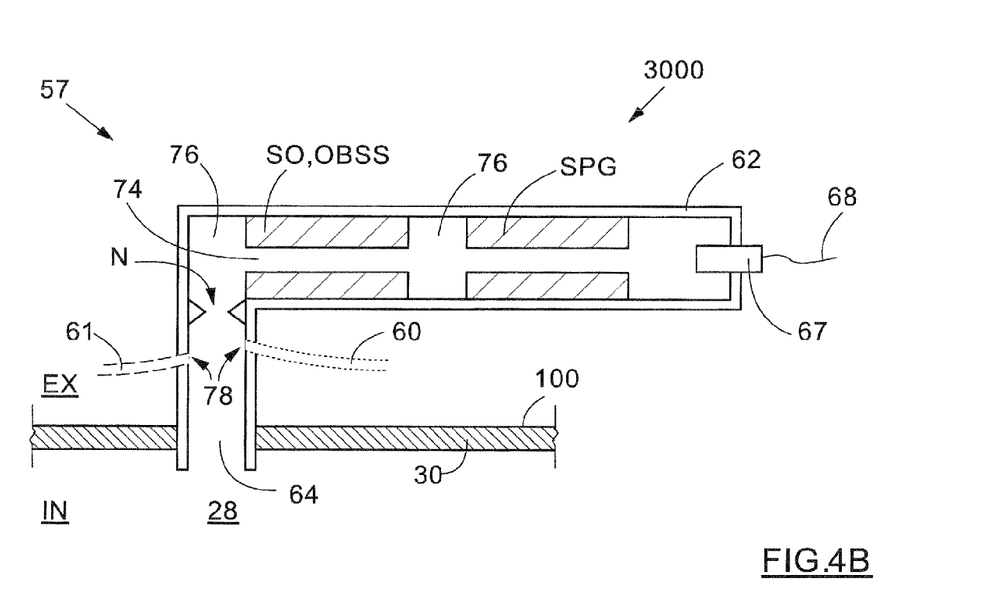

A variant configuration of the embodiment 3000 is shown in FIG. 4B, where the initiator 67 is disposed in longitudinal alignment with the solid propellant grain SPG and oxidizing-species releasing material, or ORM, selected as either a solid oxidizer SO or an oxygen-rich burning solid substance OBSS. In operation, the igniter 67 ignites the propellant grain SPG, which in turn triggers the oxidizing-species releasing material ORM to release hot gases rich in oxidizing species, in a manner similar if not identical to that described hereinabove with respect to the FIG. 4A.

The embodiments 2000 and 3000 are only examples and other embodiments may also be practical for the purpose of igniting and starting a turbine engine. Such embodiments all include a replaceable ignition module 57 having at least one solid ORM causing the release of hot gaseous oxidizing species and may be selected from such groups as consisting of: (a) a solid propellant grain SPG and a solid oxidizer SO; (b) an oxygen-rich burning solid substance OBSS; (c) a solid propellant grain SPG and an oxygen-rich burning solid substance OBSS; and (d) an oxygen-rich burning solid substance OBSS and a solid oxidizer SO.

It is noted that the replaceable ignition module 57 contains only solid-state substances, thus no substances under pressure, and does therefore not require high pressure storage safety precautions.

FIGS. 5 to 8 are further schematic and simplified illustrations of the embodiments described hereinabove now presented as block-diagrams to better exemplify the flexibility of selection of various combinations for implementation.

Figure 5:
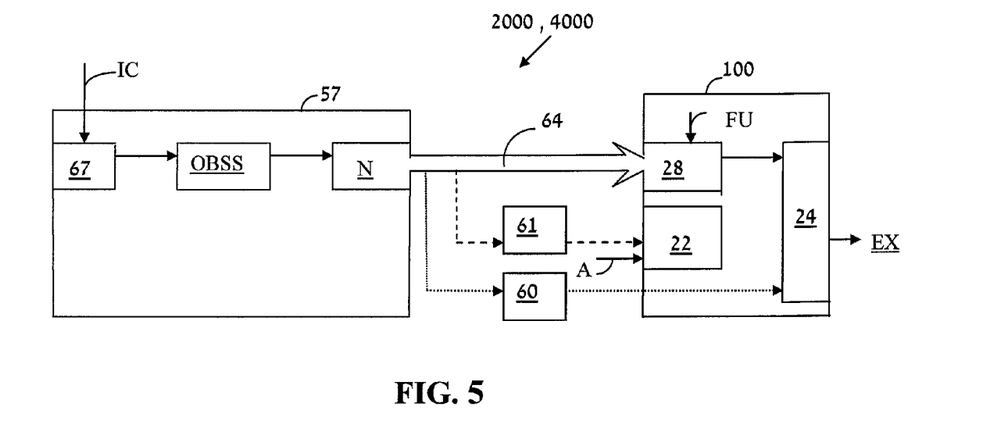
FIGS. 5 through 8 show block-diagrams of various exemplary embodiments.

FIG. 5 refers to the embodiment 4000, which is related to the embodiment 2000, and depicts the replaceable ignition module 57 and the turbine engine 100 as two separate blocks since these are two separate entities coupled for operation via the chamber passage 64, which is depicted as a hollow coupling arrow. In all the embodiments 1000 to 7000 the replaceable ignition module 57 may thus be coupled to the combustion chamber 28 of the turbine engine 100 in firm releasable retention via a single coupling element, namely the chamber passage 64.

The initiator 67, which is activated by an input command IC received from a control system not shown in the Figs., may be disposed anywhere within the replaceable ignition module 57, according, to the functional requirements for properly initiating at least one solid combustible substance, which is the OBSS in FIG. 5. The flexibility of operation and the limitations imposed on the initiator 67 are the same for all the embodiments 2000 to 7000 and will not be repeated.

After being activated, the initiator 67 ignites the oxygen-rich burning solid substance OBSS, which releases hot combustion products rich in oxidizing species via the chamber passage 64 leading into the turbine engine 100, and in particular, into the interior of the combustion chamber 28. The disposition of the replaceable ignition module 57 relative to the turbine engine 100 may be selected as desired for all the embodiments 2000 to 7000. Therefore, the length and the flexibility or rigidity of the chamber passage 64 may be chosen at wish.

The simplified illustration of the turbine engine 100 merely shows that to start the combustion process, and in addition to the introduction of the hot gases rich in oxidizing species, the combustion chamber 28 also accepts air A from the exterior via the compressor 22, and fuel FU from interior engine devices not shown in the Figs. Next, the combustion products exiting out of the combustion chamber 28 impinge on the blades of turbine 24 causing its rotation and exit therethrough to the exterior EX of the engine 100.

The process whereby the engine 100 receives hot combustion products rich in oxidizing species through the chamber passage 64 until exit to the exterior EX remains the same for all the embodiments 2000 to 7000 and therefore the interior of the block 100 and the related description will not be repeated.

The various blocks of components exhibited in the FIGS. 5 through 8 are all depicted as single units, thus in the singular, but are not limited thereto. With the replaceable ignition module 57 for example, more than one initiator 67 unit and more than one type of and even same kind of solid combustible substance or of solid oxidizer may be selected for implementation if desired. Furthermore, more than one replaceable ignition module 57 may be coupled to one or to a plurality of combustion chambers 28 pertaining to the same turbine engine 100. A plurality of chamber passages 64 may be provided with the replaceable ignition module 57, to facilitate coupling, replacement, and retrofit operations. Likewise, the turbine engine 100 may be operational with more than one combustion chambers 28 and more than one turbine disk 24. One replaceable ignition module 57 may be used for engine start, and other replaceable ignition module(s) 57 may serve for restart of a turbine engine 100 after an engine intentional or unintentional stop.

When starting an engine 100, bleeding hot gases out of the ignition module 57 and ducting those gases via the turbine starting conduit 60, shown as a dotted line in FIG. 5, to impinge on the blades of the turbine 24 will rotate the shaft 20, whereafter the gases will exit to the exterior EX. Alternatively, bleeding hot gases out of the ignition module 57 via the compressor starting conduit 61, shown as a dashed line in FIG. 5, to impinge on the blades of the compressor 22, and from there to exit to the exterior EX, will also rotate the shaft 20. If desired, one or more turbine starting conduits 60, or compressor starting conduits 61 may be used. Since these optional starting abilities of the ignition module 57 are the same for all the embodiments, the description thereof will not be repeated or depicted again.

Figure 6:
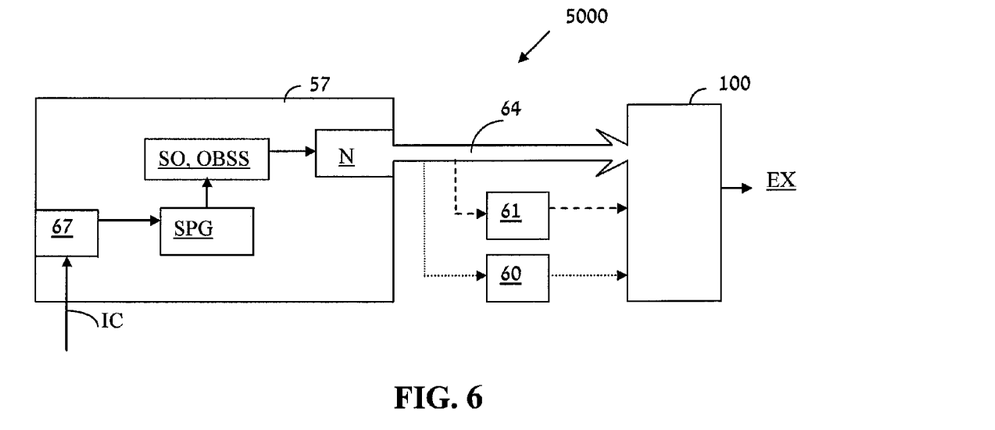

FIG. 6 shows schematically the embodiment 5000, which relates to the embodiment 3000. This embodiment 5000 is similar in principle to the embodiment 4000.

Once ignited by the initiator 67, the solid propellant grain SPG burns to heat the solid oxidizer SO, which undergoes thermal decomposition and generates hot gases rich in oxidizing species. The hot gases released by the solid propellant grain SPG and by the solid oxidizer SO now mix together and flow via the chamber passage 64 into the combustion chamber 28, where they activate the ignition process, and exit the engine 100 through the turbine 24 and the exit EX.

Figure 7:
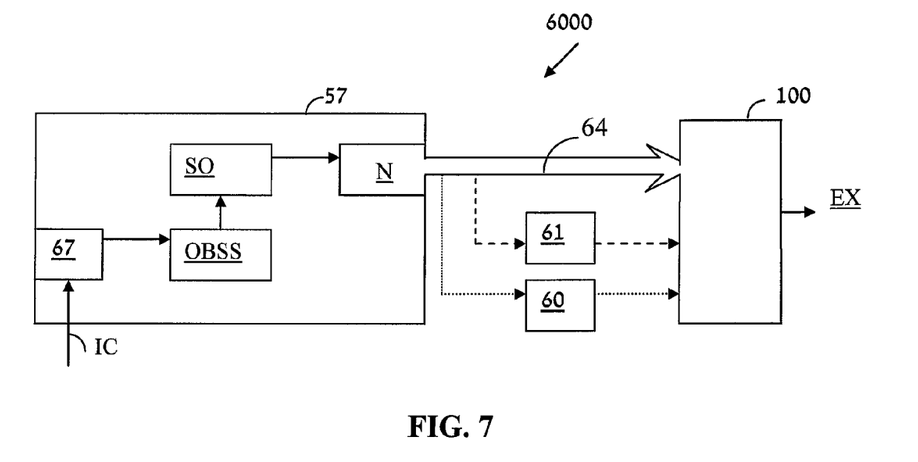

In FIG. 7, which depicts an exemplary embodiment 6000 the ignition module 57 is shown to contain two different solid chemical substances. The conventional solid propellant grain SPG of the embodiment 5000 is replaced here by the oxygen-rich burning solid substance OBSS. This configuration is useful, for example, when a large amount of hot oxidizing species is desired, and does not require any changes to the structure of the ignition module 57. If desired, one or more conduits, such as the turbine starting conduit 60 or the compressor-starting conduit 61, may be coupled to the ignition module 57.

Figure 8:
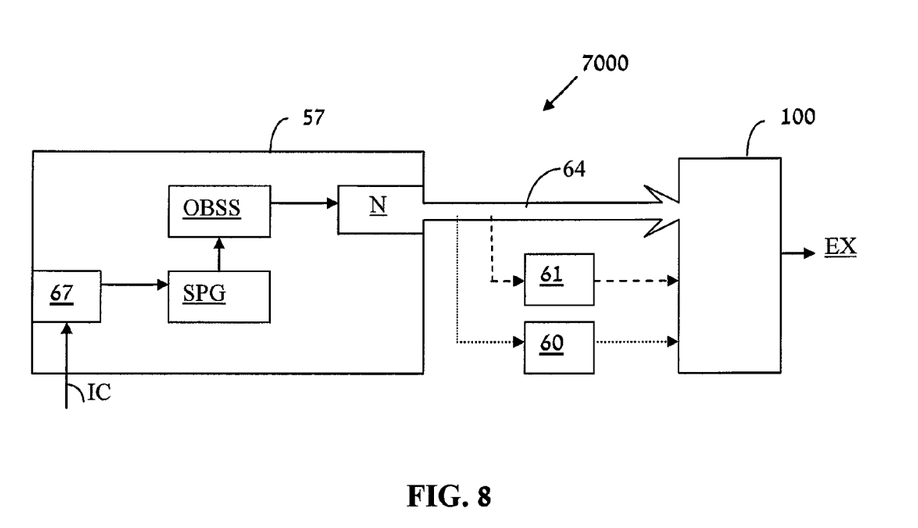

FIG. 8 illustrates another exemplary embodiment 7000 where the replaceable ignition module 57 contains two solid combustible substances, namely a solid propellant grain SPG and an oxygen-rich burning solid substance OBSS. The hot gases released by the solid propellant grain SPG and by the oxygen-rich burning solid substance OBSS now mix together and flow via the chamber passage(s) 64 into the combustion chamber(s) 28 wherein they activate the ignition process, and exit the engine 100 through the turbine 24 and via the exhaust section, not shown here for the sake of simplicity.

Various combinations of the blocks or units shown in the block-diagrams are possible, as exemplified by the embodiment 7000. One single initiator 67 may be disposed to ignite the solid propellant grain SPG, which in turn, may ignite the oxygen-rich burning solid substance OBSS. As an alternative, for the sake of redundancy, more than one separate initiator 67 may be used, and the number of input commands IC may be smaller, equal or larger than the number of initiators 67. In addition, the SPG and the OBSS may be disposed either adjacent to each other or kept separated and distanced away from each other, respectively, in the same portion or in different portions of the replaceable ignition module 57.

The embodiments 1000 through 7000 shown in the FIGS. 2, 3A, 3B, 4A, 4B and 5 through 8, all include the additional capability of the replaceable ignition module 57 to also operate as a starter for the turbine engine 100.

The solid combustible substances of the replaceable ignition module 57, namely the solid propellant grain SPG and the oxygen-rich burning solid substance OBSS, the solid oxidizer SO, and the initiator 67 are all depletable, and may be manufactured according to any method or technology known to the art. For example, a mass of solid oxidizer SO is possibly implemented as a compacted mechanically blended mixture of pellets or grains with a various particle-size distribution for example, or as a chemically combined compound.

Furthermore, with regard to the solid combustible substances and the solid oxidizer, their grain may vary in size and shape, and their disposition in the interior of the replaceable ignition module 57 should be appropriately selected to ensure suitable and sufficient release of hot oxidizing-species-rich gases into the interior of the engine 100.

Even though possibly being manufactured as cylindrical bodies, the masses of depletable solid substances and components, contained in the replaceable ignition module 57 may be implemented in any desired practical size, shape, and quantity sufficient to deliver the amount of oxidizing species necessary for the reliable starting of the turbine engine 100.

The masses of depletable solid combustible substances may thus be implemented for example as a plurality of, or at least one mass such as a block, rod, plate, mesh, porous element, or grain. In addition, the size and shape of the depletable solid combustible substances may be selected to accommodate the practical configurations required to match various types of different replaceable ignition modules 57, according to their geometry and required rate of release of oxidizing species.

Since the replaceable ignition module 57 is a stand-alone and independent device, and is configured for exchangeable replacement after depletion, the retrofit of existing turbine engines is a viable option. Moreover, if desired, a spent or depleted replaceable ignition module 57 is easily exchangeable for a new one and may be coupled in releasable sealed connection to a turbine engine by a single connection point.

INDUSTRIAL APPLICABILITY

The method, the system, and the ignition module described hereinabove are applicable in industry, for example with turbine engine manufacturers, turbine engine operators, and providers of ancillary equipment for turbine engines.

It will be appreciated by persons skilled in the art, that the present invention is not limited to what has been particularly shown and described hereinabove. For example, the replaceable ignition module 57 may be implemented as a disposable or as a rechargeable device. In the former case, the replaceable ignition module 57 is disposed of after use, whereas in the latter case the replaceable ignition module 57 is refurbished and refilled with initiator(s) 67 and solid substance(s) as necessary. Rather, the scope of the present invention is defined by the appended claims and includes both combinations and sub-combinations of the various features described hereinabove, as well as variations and modifications thereof which would occur to persons skilled in the art upon reading the foregoing description.

LIST OF ITEMS

10 Background-art turbine engine
12 engine housing
16 air intake
18 interior of the housing 12
20 shaft
22 compressor
24 turbine
26 rotating assembly, or rotor
28 combustion chamber
30 housing wall
36 outer liner
38 inner liner
39 perforated dome
40 first stream of air indicated by the arrows 40
42 second stream of air
44 flame tube
46 second flow
48 igniter opening
52 fuel vaporizer
54 fuel inlet, or fuel injector
56 igniter
57 replaceable ignition module
58 starter inlet
59 pyrotechnic starter or electromechanical starter
60 turbine starting conduit
61 compressor starting conduit
62 module housing 64 chamber passage
67 initiator
68 electrical conductor
74 channel
76 free volume
78 exhaust port
100 engine as in the present claimed invention
1000 embodiment of the engine 100
2000 embodiment of the igniter module 57
3000 embodiment of the igniter module 57
4000 embodiment of the igniter module 57
5000 embodiment of the igniter module 57
6000 embodiment of the igniter module 57
7000 embodiment of the igniter module 57
A air
EX exterior
F front
FU fuel
IC input command, or initiation command (initiating sequence of ignition)
IN interior
N nozzle
OBSS oxygen-rich burning solid substance
ORM oxidizing-species releasing material
PZ primary zone
R rear end
RPM revolutions per minute
SO solid oxidizer
SPG conventional solid propellant grain

The invention claimed is:

1. A method for enhancing a start of a turbine engine for reliably and rapidly reaching a stable operational regime, the turbine engine having an exterior and an interior comprising a compressor for ingesting and compressing air, a turbine coupled to the compressor, and at least one combustion chamber provided with a controlled mixture of compressed air from the compressor and fuel from a fuel feed system, to allow start of a combustion process when ignited, the method comprising
providing at least one replaceable ignition module including at least one solid combustible substance that when ignited, causes release of hot gases rich in oxidizing species, or at least one decomposing oxidizer substance that when heated, releases hot gases rich in oxidizing species,
coupling the at least one replaceable ignition module in sealed releasable retention and in fluid communication to the at least one combustion chamber of the turbine engine,
initiating ignition of the at least one solid combustible substance or of decomposition of the at least one decomposing oxidizer substance and consequent release of hot gases rich in oxidizing species,
ducting the hot gases rich in oxidizing species into the at least one combustion chamber to start the combustion process by ignition of the air and fuel mixture, and exhausting combustion products via the turbine, whereby the hot gases rich in oxidizing species start and enhance the combustion process for reliably and rapidly reaching a stable operational regime,
wherein the at least one replaceable ignition module further includes at least one exhaust port coupled in fluid communication via at least one turbine starting conduit to the turbine or via at least one compressor starting conduit to the compressor.

2. The method according to claim 1, wherein:
the at least one replaceable ignition module comprises at least one solid substance appropriately selected from the group consisting of: a) a solid propellant grain and a solid oxidizer; b) an oxygen-rich burning solid substance; c) a solid propellant grain and an oxygen-rich burning solid substance; and d) an oxygen-rich burning solid substance and a solid oxidizer.

3. The method according to claim 1, wherein:
the at least one replaceable ignition module contains at least one initiator for initiation of the at least one solid combustible substance in response to an initiation command.

4. The method according to claim 2, wherein:
the at least one replaceable ignition module includes at least one initiator for the ignition of the at least one solid combustible substance, and
the combustion of the at least one solid combustible substance causes the generation of hot gases rich in oxidizing species.

5. The method according to claim 1, wherein:
the hot gases rich in oxidizing species are generated in situ.

6. The method according to claim 1, wherein:
the hot gases rich in oxidizing species start the combustion process of the air and fuel mixture by successive heating and fuel vaporization followed by ignition.

7. The method according to claim 1, wherein:
the turbine engine comprises a plurality of combustion chambers, and
the at least one replaceable ignition module is coupled to at least one combustion chamber out of the plurality of combustion chambers.

8. The method according to claim 1, wherein:
the at least one replaceable ignition module is coupled via at least one coupling element to the at least one combustion chamber.

9. The method according to claim 1, wherein:
the at least one replaceable ignition module is a unitary device having an initiator selected from the group consisting of electrical initiator and pyrotechnic initiators.

10. The method according to claim 1, wherein:
the at least one replaceable ignition module is configured for exchangeable replacement after depletion.

11. The method according to claim 1, wherein:
the at least one replaceable ignition module is configured for retrofit into existing turbine engines.

12. The method according to claim 1, wherein:
the at least one replaceable ignition module is disposed on the exterior of the turbine engine.

13. The method according to claim 1, wherein:
the at least one replaceable ignition module is configured as a single unitary module.

14. The method according to claim 1, wherein:
the at least one ignition module is replaceable without requiring dismantling of the turbine engine.

15. The method according to claim 1, wherein:
the at least one replaceable ignition module is void of a substance under pressure.

16. The method according to claim 1, wherein:
a portion of the hot gases rich in oxidizing species are ducted via the at least one exhaust port and the at least one turbine starting conduit or compressor starting conduit, for impinging on and initiating rotation of the, respectively, turbine or compressor.

17. A system operative for enhancing a start procedure of a turbine engine having an exterior and an interior, the system comprising:

the turbine engine having a compressor for ingesting and for compressing air, a turbine coupled to the compressor, at least one combustion chamber provided with a controlled mixture of compressed air from the compressor and fuel from a fuel feed system, to allow start of a combustion process when ignited, at least one replaceable ignition module containing at least one solid combustible substance that when ignited, causes generation of hot gaseous oxidizing species, or at least one decomposing oxidizer substance that when heated, releases hot gases rich in oxidizing species, and the replaceable ignition module being coupled in sealed releasable retention and in fluid communication to the at least one combustion chamber, at least one initiator also contained in the at least one replaceable ignition module, for initiating ignition of the at least one solid combustible substance or of decomposition of the at least one decomposing oxidizer substance and subsequent generation of hot gases rich in oxidizing species, and a chamber passage for ducting the hot gases rich in oxidizing species from the replaceable ignition module into the combustion chamber for starting the combustion process by ignition of the inflammable air and fuel mixture, whereafter resulting combustion products are exhausted via the turbine, and whereby the hot gases rich in oxidizing species generated by the replaceable at least one ignition module start and enhance the combustion process for rapidly reaching a stable operational regime of the turbine engine, wherein the at least one replaceable ignition module further includes at least one exhaust port coupled in fluid communication via at least one turbine starting conduit to the turbine or via at least one compressor starting conduit to the compressor.

18. The system according to claim 17, wherein:
the at least one replaceable ignition module comprises at least one solid substance appropriately selected from the group consisting of: a) a solid propellant grain and a solid oxidizer, b) an oxygen-rich burning solid substance, c) a solid propellant grain and an oxygen-rich burning solid substance, and d) an oxygen-rich burning solid substance and a solid oxidizer.

19. The system according to claim 17, wherein:
the at least one replaceable ignition module contains at least one initiator for initiation of the at least one solid combustible substance in response to an initiation command.

20. A replaceable ignition module configured for enhancing a start procedure of a turbine engine having an interior and an exterior, a compressor for ingesting and for compressing air, a turbine coupled to the compressor, and at least one combustion chamber receiving compressed air from the compressor and providing a controlled inflammable mixture of air and fuel dosed to allow start of a combustion process when ignited, the replaceable ignition module comprising:

a module housing encasing at least one solid combustible substance that causes generation of hot gases rich in oxidizing species when ignited, or at least one decomposing oxidizer substance that when heated, releases hot gases rich in oxidizing species, the module housing being coupled in sealed releasable 15 retention and in fluid communication with the at least one combustion chamber, at least one initiator for initiating ignition of the at least one solid combustible substance or of decomposition of the at least one decomposing oxidizer substance and subsequent generation of hot gases rich in oxidizing species, and a chamber passage for ducting the hot gases rich in oxidizing species into the at least one combustion chamber for starting the combustion process by ignition of the inflammable air-fuel mixture, whereafter resulting combustion products are exhausted via the turbine, whereby the hot gases rich in oxidizing species released by the at least one replaceable ignition module start and enhance the combustion process for rapidly reaching a stable operational regime of the turbine engine, wherein the at least one replaceable ignition module further includes at least one exhaust port coupled in fluid communication via at least one turbine starting conduit to the turbine or via at least one compressor starting conduit to the compressor.

* * * * *